US009872160B2

(12) United States Patent
Shipley et al.

(10) Patent No.: US 9,872,160 B2
(45) Date of Patent: *Jan. 16, 2018

(54) SESSION QUALITY DISPLAY IN A WIRELESS COMMUNICATION SYSTEM

(71) Applicant: Sprint Communications Company L.P., Overland Park, KS (US)

(72) Inventors: Trevor Daniel Shipley, Olathe, KS (US); Jason W. Rincker, Overland Park, KS (US); Benjamin P. Blinn, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/286,956

(22) Filed: Oct. 6, 2016

(65) Prior Publication Data

US 2017/0026813 A1    Jan. 26, 2017

Related U.S. Application Data

(63) Continuation of application No. 14/072,420, filed on Nov. 5, 2013, now Pat. No. 9,485,800.

(51) Int. Cl.
| G06F 15/167 | (2006.01) |
| G06F 15/173 | (2006.01) |
| G06F 15/16 | (2006.01) |
| H04M 3/00 | (2006.01) |
| H04W 24/00 | (2009.01) |
| H04W 4/00 | (2009.01) |
| H04W 36/00 | (2009.01) |
| H04B 7/00 | (2006.01) |
| H04M 1/00 | (2006.01) |
| H04W 4/20 | (2009.01) |

(Continued)

(52) U.S. Cl.
CPC .......... *H04W 4/20* (2013.01); *G06F 3/04817* (2013.01); *H04B 7/0632* (2013.01); *H04L 61/1594* (2013.01); *H04M 1/72583* (2013.01); *H04W 76/04* (2013.01); *H04M 1/72569* (2013.01)

(58) Field of Classification Search
CPC ...... H04L 69/16; H04W 24/02; H04W 24/08; H04W 36/0083; H04W 36/04; H04W 36/10; H04W 76/04; H04W 4/20
USPC ........ 709/212, 224, 228, 246; 455/419, 424, 455/435.2, 437, 512, 518, 552.1
See application file for complete search history.

(56) References Cited

U.S. PATENT DOCUMENTS 7,805,146 B1    9/2010  Beyer, Jr.
2009/0280814 A1    11/2009  Farnsworth

FOREIGN PATENT DOCUMENTS

WO        2012139050        10/2012

*Primary Examiner* — Farzana Huq

(57) ABSTRACT

A wireless communication device maintains a communication contact. The wireless communication device receives media session quality data for the communication contact. The wireless communication device receives a request for a media session with the communication contact and responsively identifies estimated media session quality with the communication contact based on the media session quality data for the communication contact. The wireless communication device displays a session activation icon for the media session request that visually indicates the estimated media session quality for the media session with the communication contact. The wireless communication device receives a user selection of the session activation icon and responsively establishes the media session with the communication contact.

20 Claims, 11 Drawing Sheets

(51) Int. Cl.
*H04W 76/04* (2009.01)
*G06F 3/0481* (2013.01)
*H04B 7/06* (2006.01)
*H04L 29/12* (2006.01)
*H04M 1/725* (2006.01)

SESSION QUALITY DISPLAY IN A WIRELESS COMMUNICATION SYSTEM

RELATED CASES

This patent application is a continuation of U.S. patent application Ser. No. 14/072,420 that was filed on Nov. 5, 2013 and is entitled, "SESSION QUALITY DISPLAY IN A WIRELESS COMMUNICATION SYSTEM." U.S. patent application Ser. No. 14/072,420 is hereby incorporated by reference into this patent application.

TECHNICAL BACKGROUND

Wireless signal strength varies according to how far a wireless communication device is away from its access point. Including RF interfaces such as cellular or Wi-Fi, the quality of a wireless link may be impacted by radio noise and obstructions to line of sight. The strength of a wireless link's signal is measured when received by a wireless communication device or a base station. The received signal strength is correlated to the overall quality of a media session, but signal strength is not the only factor that determines session quality. A high quality session has few transmission failures, such as lost or late payload or retransmissions.

In various wireless communication devices such as mobile phones, signal strength is displayed bars. A displayed signal strength indicates the strength of the wireless link between the device and its access point. In various scenarios the signal strength of the connecting wireless link is insufficient to indicate the quality of a media session. The counter-party on the other side of the call may also be connected wirelessly, in which case the session quality may depend on conditions of two wireless networks. Congestion on a backhaul or backbone may also impact session quality.

TECHNICAL OVERVIEW

A wireless communication device maintains a communication contact. The wireless communication device receives media session quality data for the communication contact. The wireless communication device receives a request for a media session with the communication contact and responsively identifies estimated media session quality with the communication contact based on the media session quality data for the communication contact. The wireless communication device displays a session activation icon for the media session request that visually indicates the estimated media session quality for the media session with the communication contact. The wireless communication device receives a user selection of the session activation icon and responsively establishes the media session with the communication contact.

DETAILED DESCRIPTION

Figure 1:
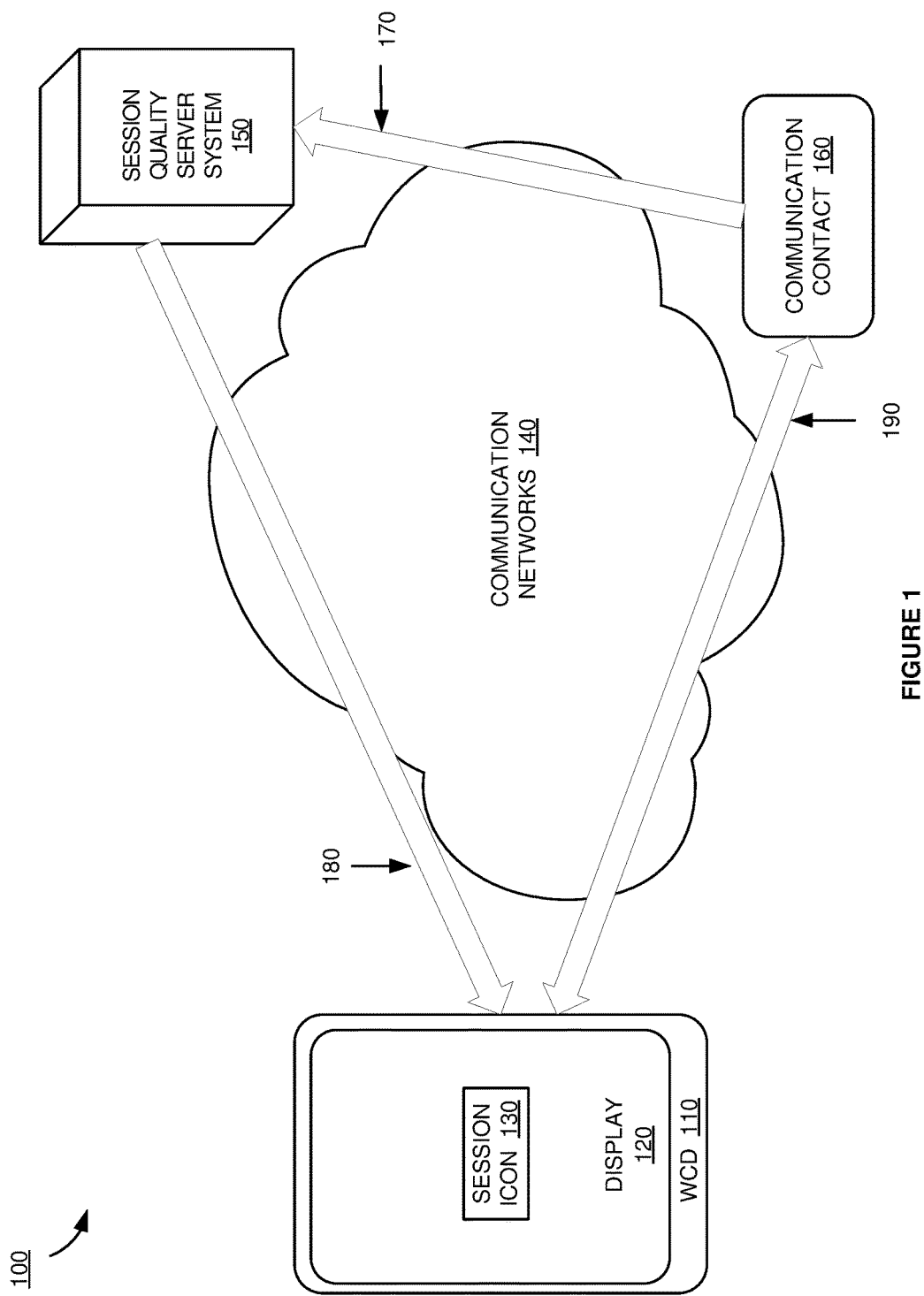
FIG. 1 illustrates a wireless communication system that delivers visual indications of session quality.

FIG. 1 illustrates wireless communication system 100 using session quality server system 150 to obtain and transfer communication status data. Session quality server system 150 identifies communication contact 160 and wireless communication device 110. System 150, contact 160, and device 110 may use communication networks 140 to communicate with each other using links 170, 180, and 190. Session quality server system 150 uses link 170 to obtain the communication status data of communication contact 160. Session quality server system 150 identifies wireless communication device 110 as interested in the communication status data of a set of identifiable communication contacts that includes communication contact 160.

Session quality server system 150 delivers over link 180 the communication status data of the set of identifiable communication contacts. Data delivered over link 180 is received and remembered by wireless communication device 110. Later wireless communication device 110 receives a session request indicating that communication contact 160 may participate in a media session with the user. Examples of a session request for a media session include an alert for an incoming call from the given contact or the appearance of a button that can call the given contact.

In reaction to wireless communication device 110 receiving a session request indicating a communication contact, display 120 shows session icon 130 in a way that visually indicates the communication status for a possible media session to be conducted on link 190. When the user activates session icon 130, perhaps by pressing it, the media session is established. For example the session icon may be the button that answers an incoming call. The incoming call may be a voice call to be carried on link 190.

Figure 2:
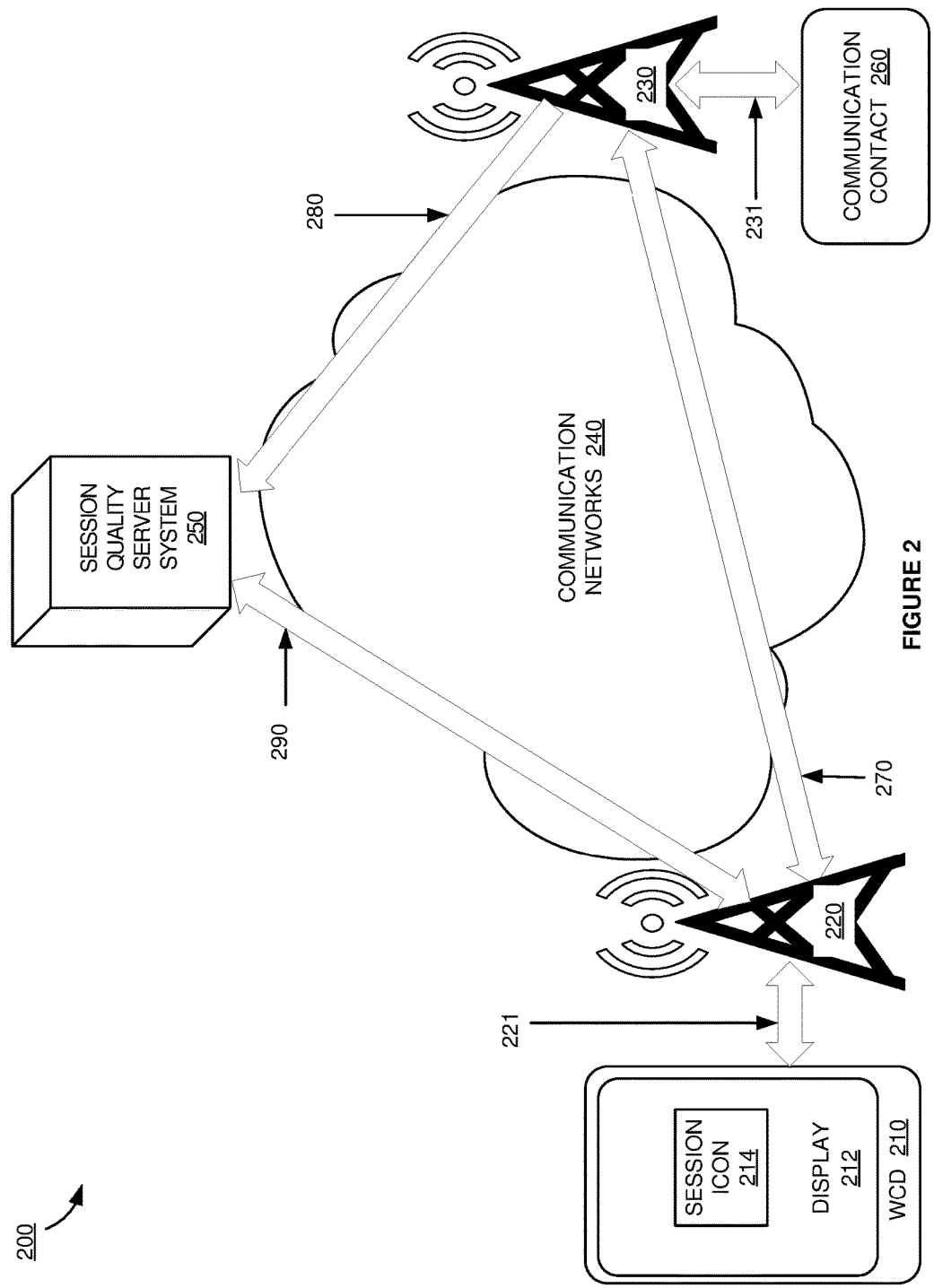
FIG. 2 illustrates a wireless communication system that delivers visual indications of session quality.

FIG. 2 illustrates wireless communication system 200, which is also an example of system 100. Content requests arrive at CDN 211 over either of link 274 or 272 depending on which long haul ISP 207 and 208 is used for the selected IP address. Communication contact 260 connects to communication networks 240 thru access network 230. Since access network 230 is wireless in this example, communication contact 260 has a wireless communication device. Session quality server system 250 obtains communication status data for communication contact 260. This communication status data may include data regarding the quality and availability of links 231 and 280, access network 230, and communication contact 260. For example the signal quality or received signal strength of link 231 or 280 could be included in the communication status data that system 250 receives on link 280. The type of access network 230 may be Wi-Fi, cellular, or other wireless technology. The type of access network 230 may be included in the communication status data that is delivered on link 280.

Session quality server system 250 also obtains communication status data about wireless communication device 210, which is delivered over links 221 and 290 and wireless access network 220. Session quality server system 250 considers the raw communication status data regarding contact 260 and device 210 and determines a visual representation that summarizes the communication status to indicate session quality. The visual representation is the communication status data that session quality server system eventually delivers over links 290 and 221, to wireless communication device 210. Wireless communication device 210 receives and remembers the last communication status data it receives for each communication contact. If for example the party at communication contact 260 attempts to originate a voice call, wireless communication device 210 receives on link 221 a control page indicating an incoming call. Wireless communication device 210 considers the received control page as announcing a session request. Device 210 reacts to the session request by displaying session icon 214, which may be an answer button. Session icon 214 visually indicates the communication status data that device 210 earlier received regarding contact 260.

Figure 3A:
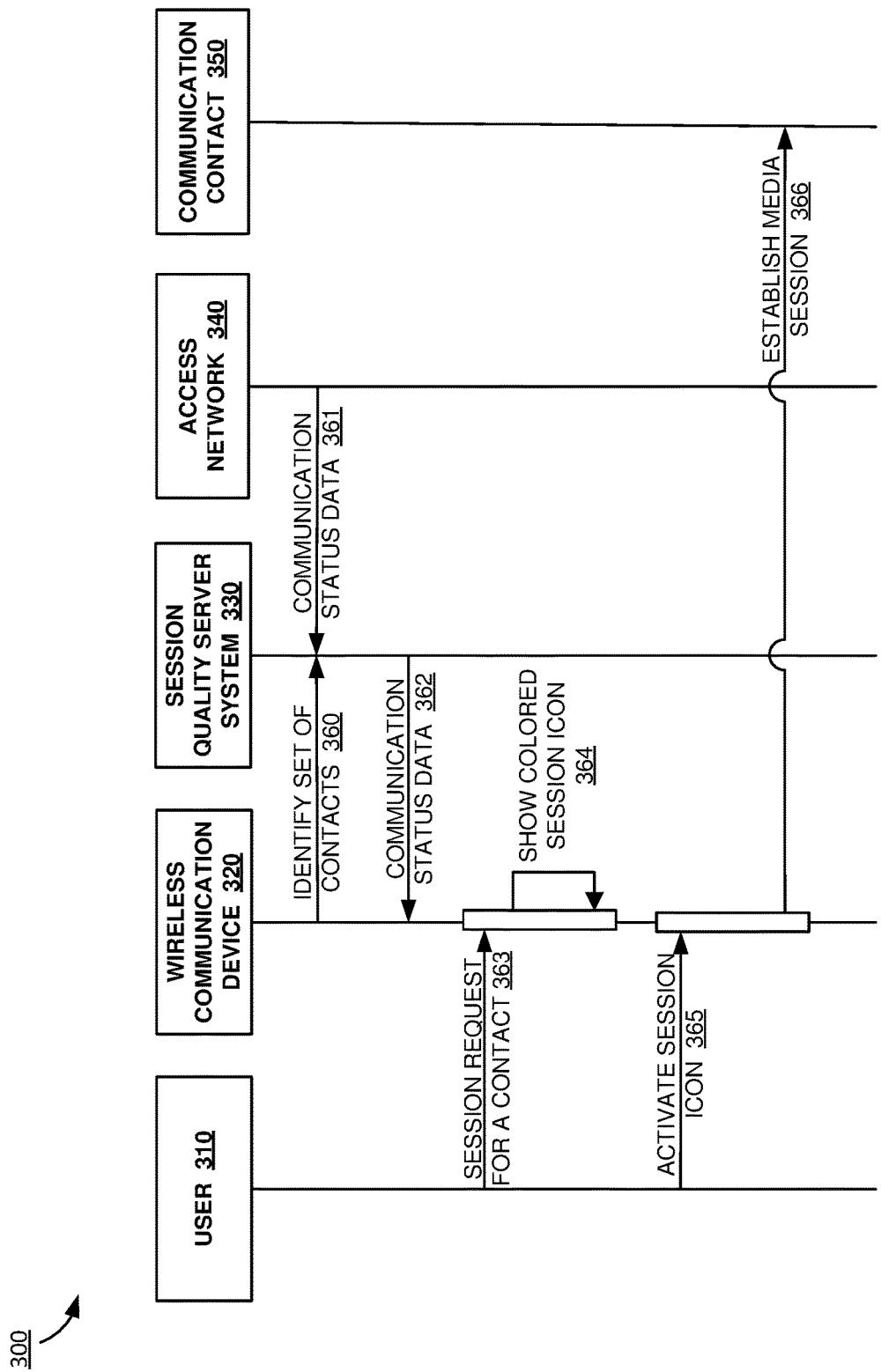
FIGS. 3A and 3B illustrate incoming and outgoing calls.

FIG. 3A illustrates scenario 301 for an outbound call originated by user 310. Session quality server system 330 identifies a set of communication contacts and obtains communication status data about communication contact 350. The identification of a set of contacts may be originally supplied to system 330 by device 320 during (360), or the identification of a contact set may originate from elsewhere. Since system 330 may obtain (361) communication status data before or after the original identification of the contact set, 360 and 361 may be simultaneous as shown in FIG. 3A, or assume any relative ordering between them. System 330 produces communication status data that includes visual details summarizing the raw data (361). The communication status data with the visual details is sent (362) to device 320, and device 320 remembers this data. At this time device 320 likely is not showing a session icon, although device 320 has the communication status data needed to visually present the session icon.

User 310 prepares (361) to call contact 350, perhaps by viewing in a contacts manager the contacts information of the party reachable at contact 350. Device 320 reacts to this by displaying (364) the session icon, which in this example is a button to call contact 350. Implementations may differ on how to visualize the communication status data in the session icon. For example the communication status data may include the color gray to indicate poor session quality. As such gray would appear on the session icon in such a way as to be meaningful to user 310. Even though the call quality is poor, user 310 attempts (365) to originate the call by pressing the session icon. The media session for the voice call is established (366) when the party reached at contact 350 accepts the call.

Figure 3B:
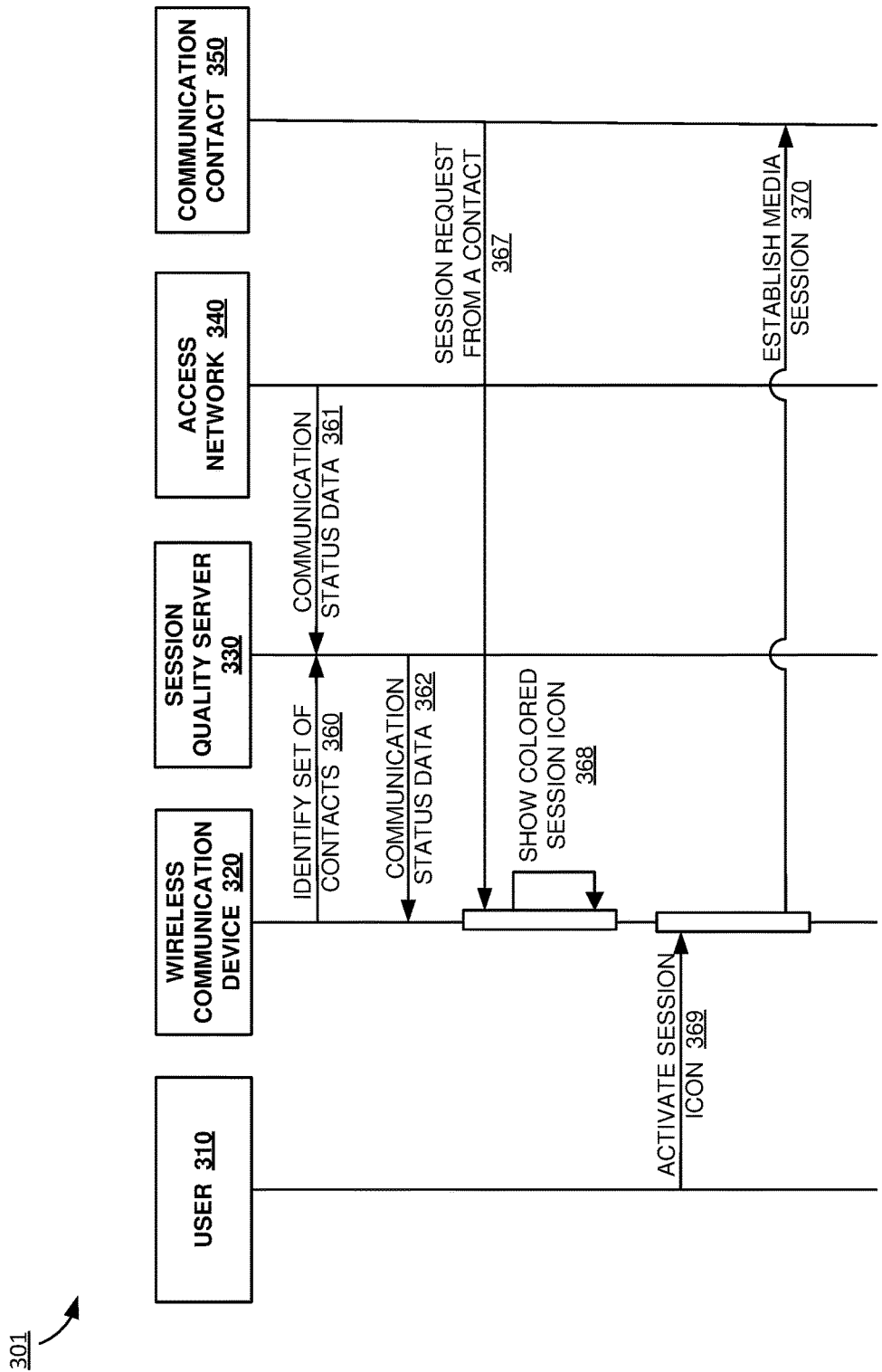

FIG. 3B illustrates scenario 301 with another call between user 310 and contact 350. Device 320 receives communication status data as before (360-62). In scenario 301 the session request originates (367) from contact 350, hence this announces an incoming call for user 310 to accept. In this example the session icon is an answer button for accepting the incoming call and colored (368) according to communication status data about contact 350. The incoming call is accepted when user 310 presses (369) the answer button. The media session is established (370) when the call is accepted.

Figure 4:
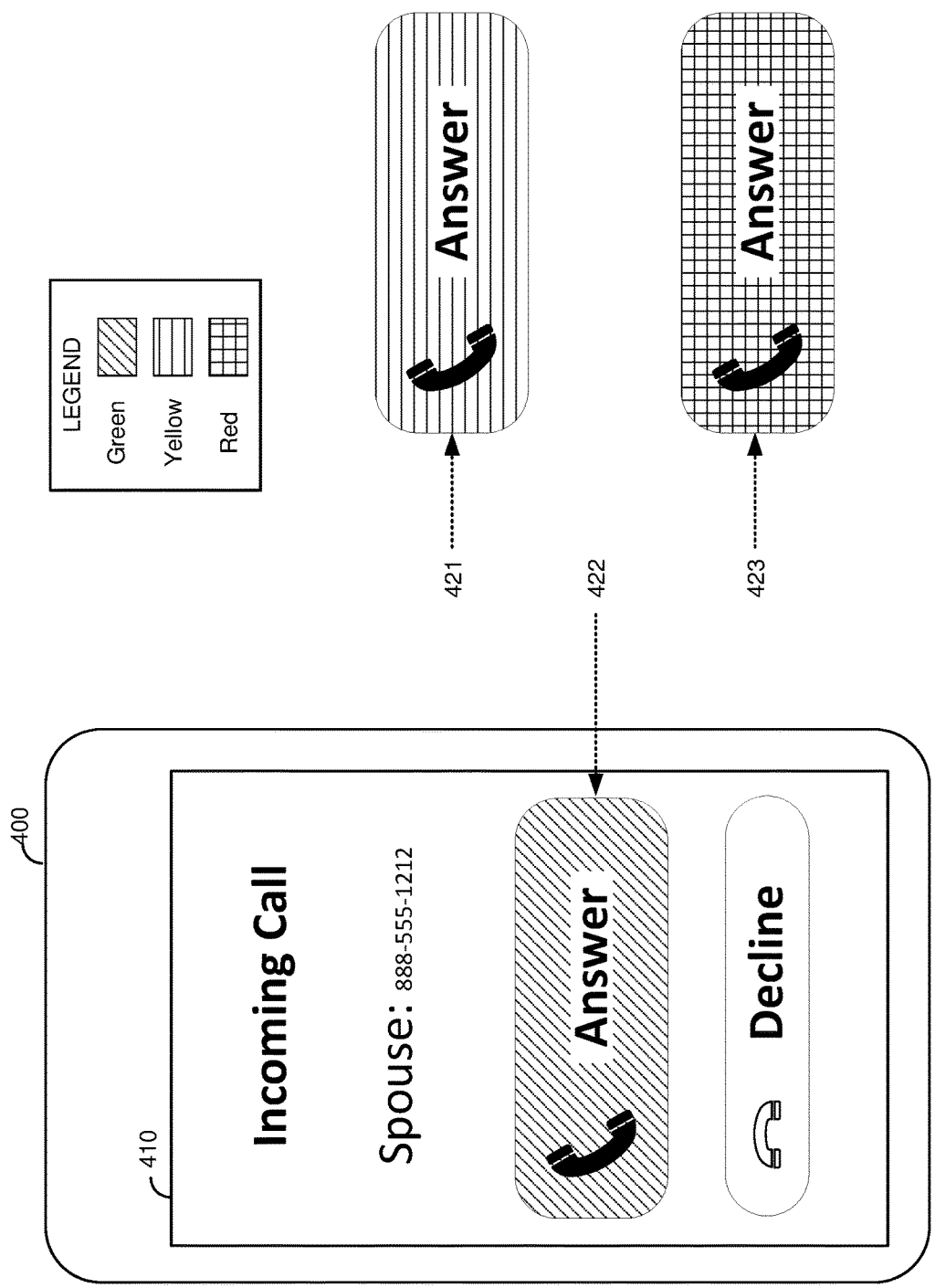
FIG. 4 illustrates a wireless communication device with a session icon.

FIG. 4 illustrates wireless communication device 400 that colors a session icon according to session quality. In this example an incoming call is being announced in display 410, which may be a touch screen. Device 400 previously received communication status data from a session quality server system. Announcing the incoming call includes displaying session icon, which is answer button 422 in this example. Answer button 422 is colored according to the color data included in the communication status data about contact 350. According to the color legend of FIG. 4, green is the color specified by the communication status data and presented in answer button 422. Green may indicate a high quality media session. If the quality of the media session were moderate instead of high, the communication status data would specify yellow instead of green, and answer button 421 would be colored yellow. A low quality media session would be indicated by coloring answer button 423 red.

Figure 5:
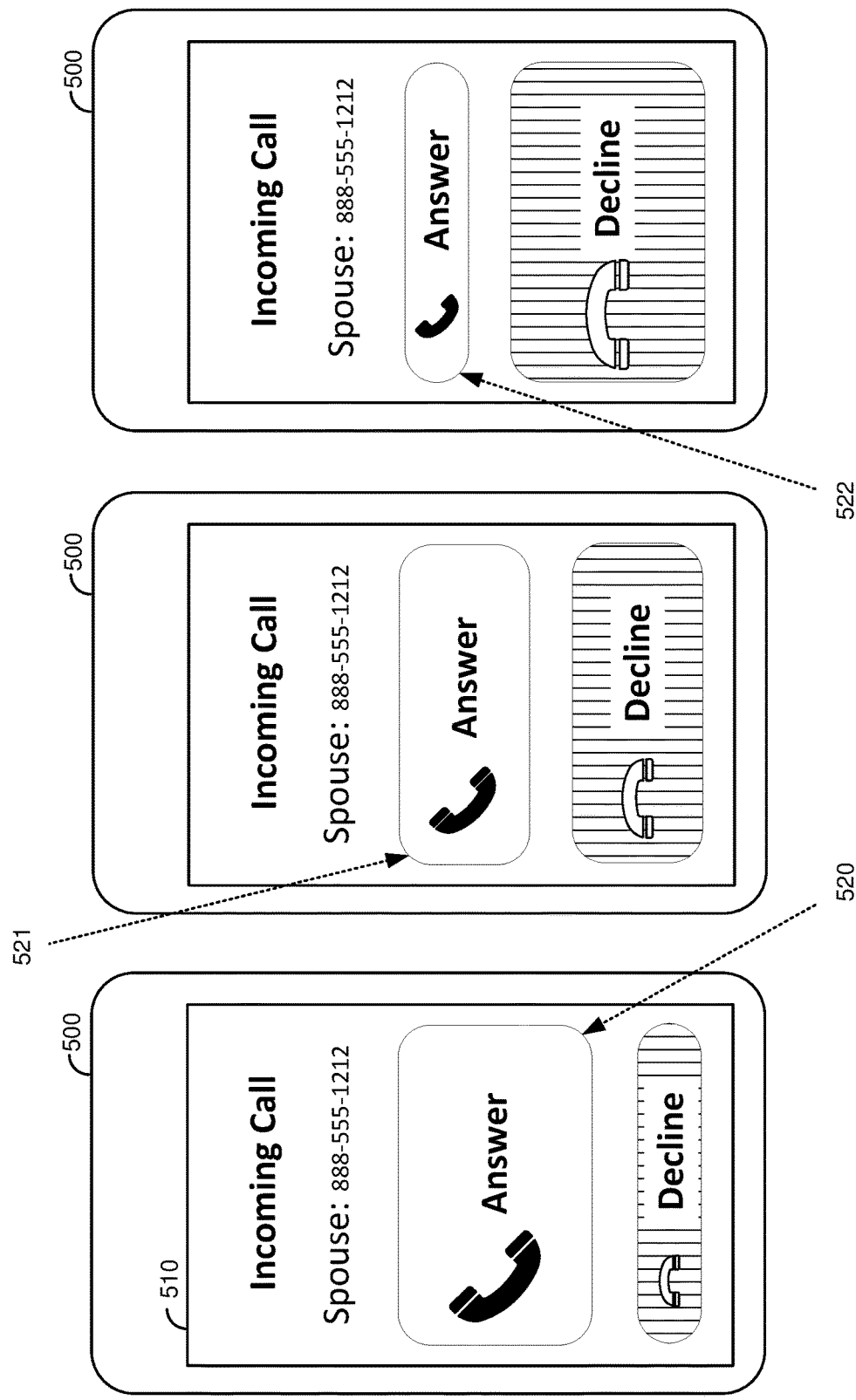
FIG. 5 illustrates a wireless communication device with a session icon.

Communication status data can be visualized without color. For example FIG. 5 illustrates wireless communication device 500 that sizes a session icon according to session quality. Screen 510 announces an incoming call, including displaying answer button 520 as a session icon. Answer button 520 is big because the call quality is high, and so the communication status data includes size data that specifies a big size. If the call quality is moderate instead of high, the communication status data specifies medium size, and answer button 521 is medium sized. If the call quality is low, then answer button 522 is small.

Figure 6:
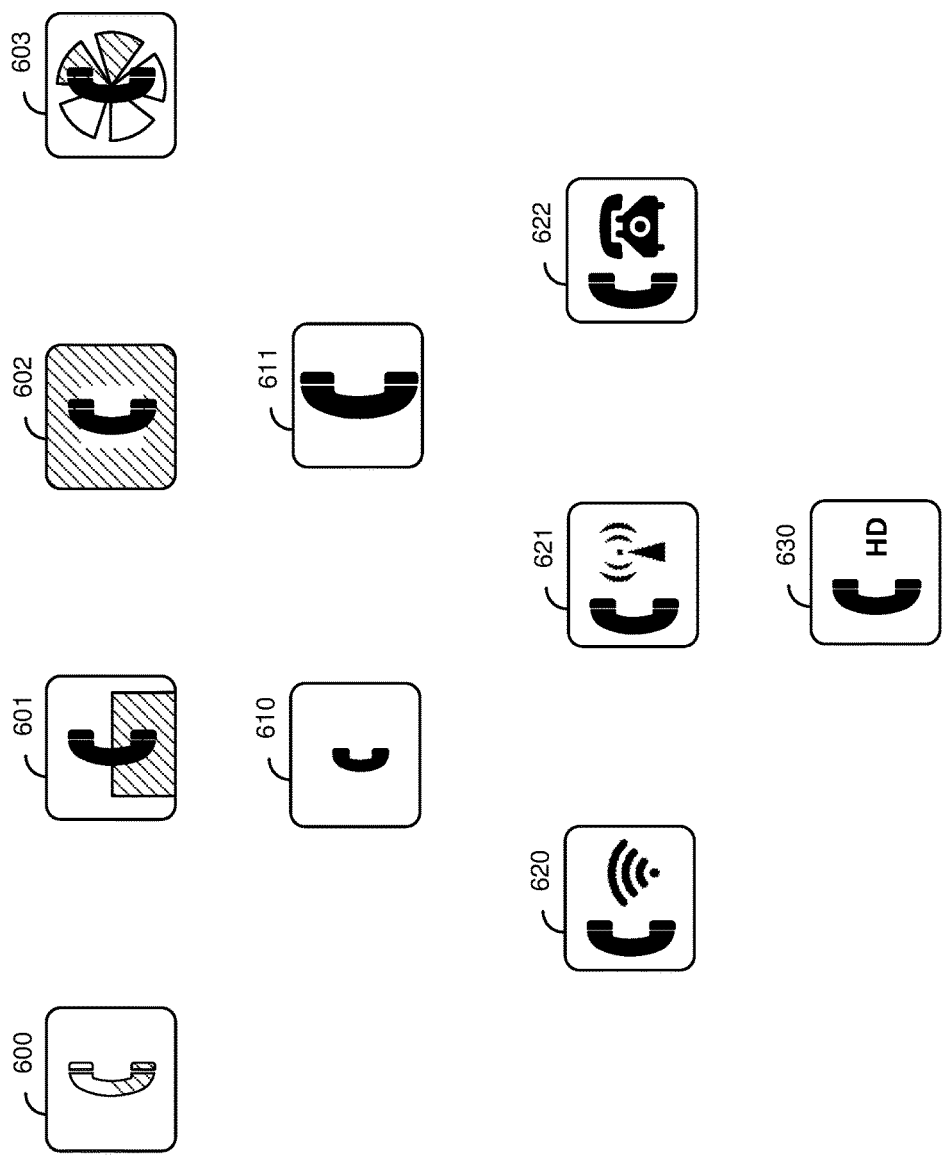
FIG. 6 illustrates session icons.

FIG. 6 shows other exemplary ways of visualizing communication status data in a session icon without relying on color. Session icons 600 and 601 show a lightly shaded portion that fills vertically according to a fill level given in the communication status data. Session icon 602 shows the fill level as a lightly shaded border that expands inward as the fill level rises to indicate better session quality. Session icon 603 shows the fill level in discrete geometric increments akin to signal bars, but arranged radially. As shown in session icons 610 and 611 a pictorial image within the session icon may be resized according to the fill level given in the communication data. Session icon 610 indicates low quality, and session icon 611 indicates high quality.

The visual indications included in the communication status data need not be numeric as fill level is. The communication status data may include flags such as a high definition (HD) voice indicator. The HD flag shown in session icon 630 might for example be included when both communication devices that would participate in a media session support HD voice and the involved networks can carry HD voice. The two parties of a media session may be connected to different access networks. The type of access network of the counter party contact may be included in the communication status data, such that a party may be shown a session icon that visually indicates the access network type of the counter party contact. A visual indication of access network type may be included in communication status data as a pictorial icon. For example session icon 620 shows that a communication contact is connected to a Wi-Fi access network. Session icon 621 shows that a communication contact is connected to a cellular network. Session icon 622 shows that a communication contact is connected by a land line.

Figure 7:
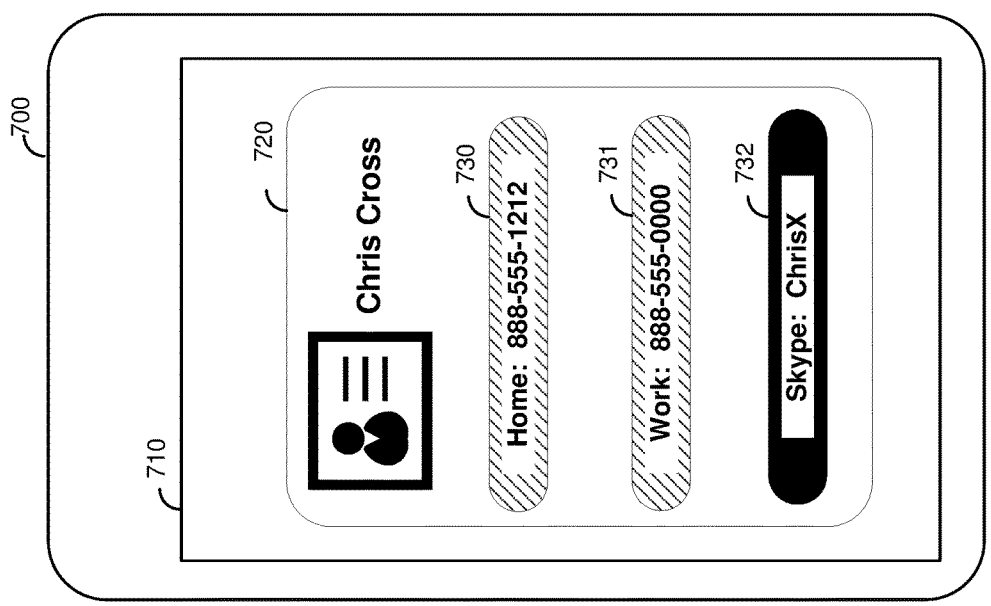
FIG. 7 illustrates a wireless communication device with multiple session icons.

FIG. 7 illustrates multiple session icons 730-32 appearing on touch screen display 710 in exemplary wireless communication device 700. As shown device 700 runs a contacts manager application. The user is currently viewing contact information 720 of party Chris Cross. What is not shown is how the user navigated to contact information 720. For example if the user began by launching the contacts manager application, then the user might initially be shown a list of parties. When the user selects Chris Cross from the list of parties, device 700 reacts by showing contact information 720 and further handling the user's selection as one or more session requests. Since contact information 720 includes three communication contacts, the user's navigation to contact information 720 is recognized by device 700 as three session requests, one session request for each communication contact. Reacting to three session requests causes this example to show three session icons 730-32, one for each communication contact of Chris Cross.

Each of session icons 730-32 regards a separate communication contact and so visually indicates separate communication status data. If the session quality is encoded as shading data in the communication status data, then the dark shading of session icon 732 may suggest that activating session icon 732 would originate a higher quality call than would the activation of session icon 730 or 731. The communication status data of session icons 730-31 visually indicate a lower call quality, perhaps because device 700 can only reach the communication contacts of these session icons by connecting to a cellular access network of lower call quality. Whereas session icon 732 might be darker because device 700 can reach the communication contact of session icon 732 by connecting to a Wi-Fi access network of higher call quality. Those are examples of the access network of device 700 affecting the communication status data that is processed by the session quality server system.

However a communication contact may also connect to an access network that affects communication status data. The communication status data given to wireless communication device 700 is an integration of communication status data of device 700 and the communication status data of the communication contact of session icon 732. As such it is possible that session icon 730 or 731 is lightly shaded because of communication status data of the corresponding communication contact.

Figure 8:
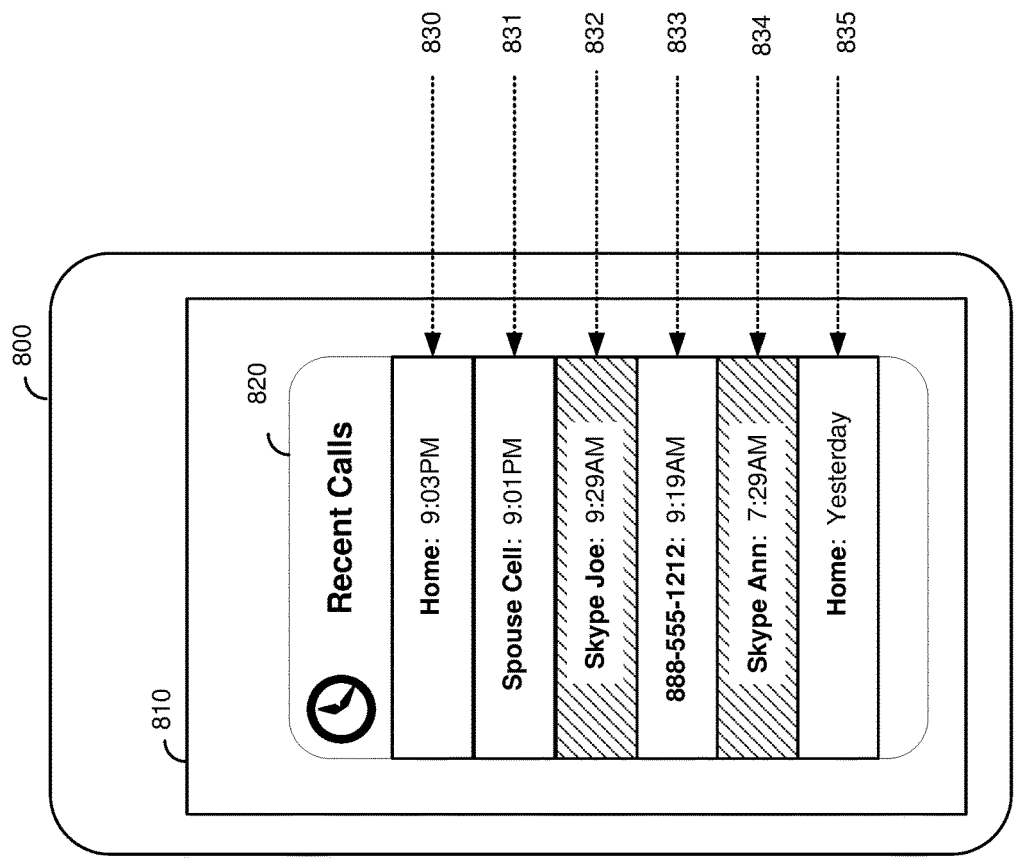
FIG. 8 illustrates a wireless communication device with multiple session icons.

FIG. 8 illustrates wireless communication device 800, which may be a smart phone with touch screen 810 or other device that can display interactive icons and has a wireless transceiver. The user is viewing call history 820. Each call in the call history appears as a shaded or unshaded horizontal stripe, which are session icons 830-835 that originate a call when activated. Session icons 832 and 834 may be shaded because the communication status data given to wireless communication device 800 included shading to indicate a low quality media session. Perhaps the media quality is low because only for session icons 832 and 834 does device 800 connect to a Wi-Fi network with a weak signal.

Figure 9:
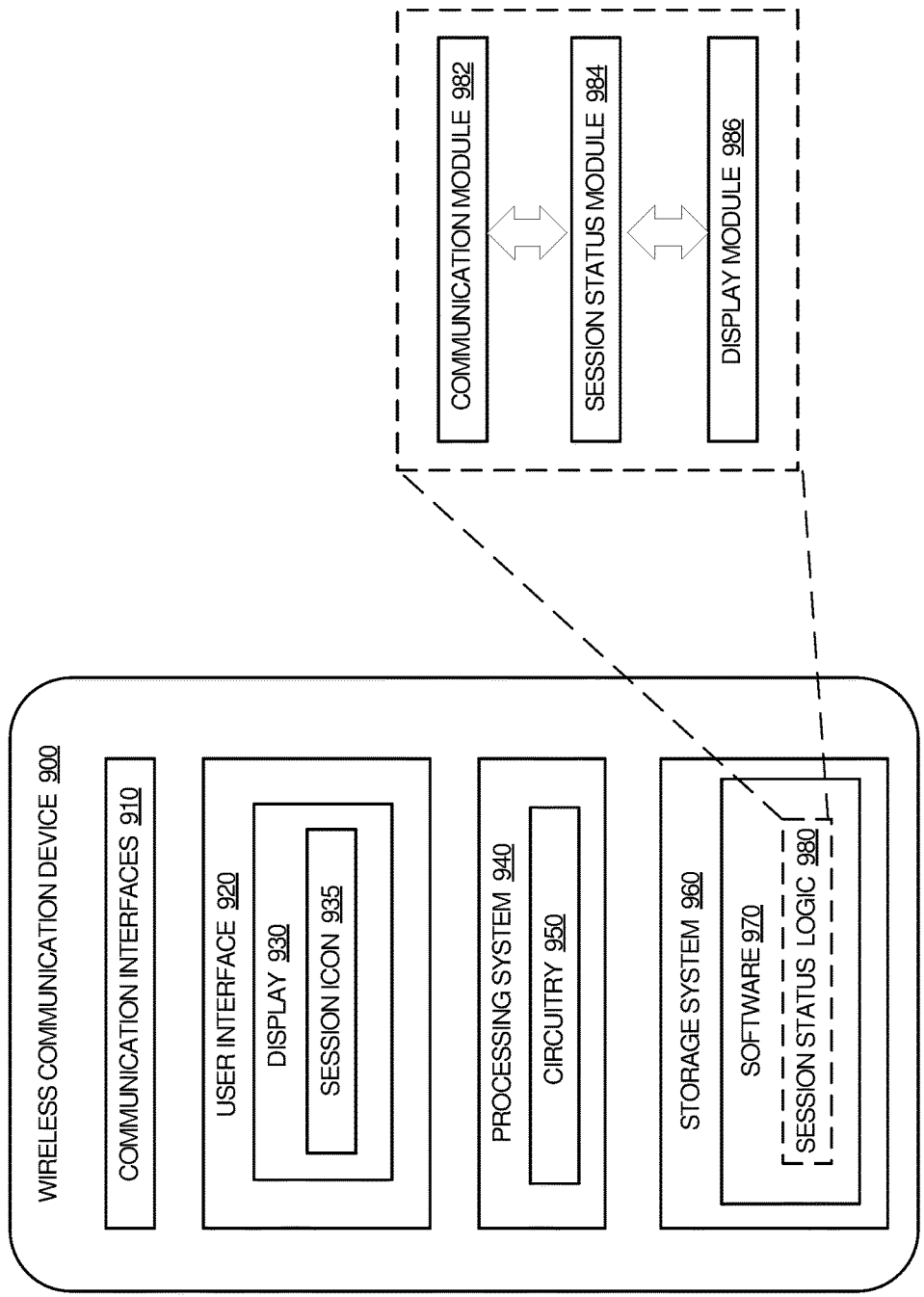
FIG. 9 illustrates an internal configuration of a wireless communication device that displays session icons.
Figure 10:
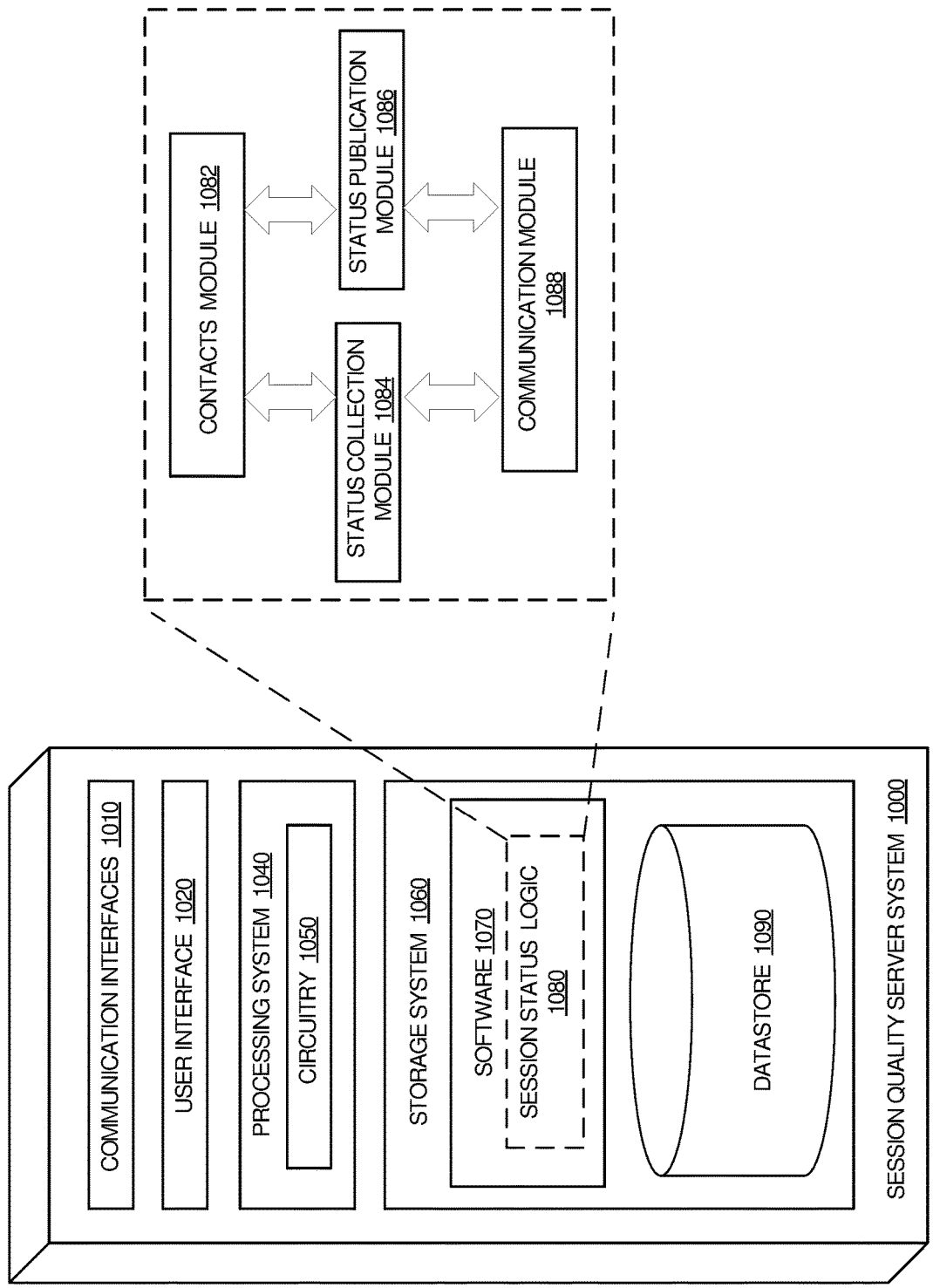
FIG. 10 illustrates an internal configuration of a session quality server system.

FIG. 9 illustrates wireless communication device 900. Wireless communication device 900 may have the same configuration of other wireless communication devices 110, 210, 320, 400, 500, 700, or 800, although these other devices could use alternative configurations. Wireless communication device 900 comprises communication interfaces 910, user interface 920, and processing system 940. Processing system 940 is linked to communication interfaces 910 and user interface 920. Processing system 940 includes processing circuitry 950 which is connected to storage system 960 that stores operating software 970. Wireless communication device 900 may include other well-known components such as a battery and enclosure that are not shown for clarity. Wireless communication device 900 may be a telephone, computer, mobile Internet appliance, game console, or some other wireless communication apparatus—including combinations thereof.

Communication interfaces 910 comprises RF communication circuitry and an antenna. The RF communication circuitry typically includes an amplifier, filter, RF modulator, and signal processing circuitry. Communication interfaces 910 may also include a memory device, software, processing circuitry, or some other communication device. Communication interfaces 910 use various protocols, such as CDMA, EVDO, WIMAX, GSM, LTE, Wi-Fi, HSPA, Bluetooth, 1×RTT or some other wireless communication format.

User interface 920 comprises components that interact with a user to receive user inputs and to present media and/or information. User interface 920 includes display 930 and may also include a speaker, microphone, buttons, lights, touch screen, touch pad, scroll wheel, communication port, or some other user input/output apparatus—including combinations thereof.

Processing circuitry 950 comprises microprocessor and other circuitry that retrieves and executes operating software 970 from storage system 960. Storage system 960 comprises a non-transitory storage medium, such as a disk drive, flash drive, data storage circuitry, or some other memory apparatus. Processing circuitry 950 is typically mounted on a circuit board that may also hold storage system 960 and portions of communication interfaces 910 and user interface 920. Operating software 970 comprises computer programs, firmware, or some other form of machine-readable processing instructions. Operating software 970 may include an operating system, applications, drivers, and session status logic tailored according to desired features. Operating software 970 may also include utilities or some other type of software. When executed by processing circuitry 950, operating software 970 directs processing system 940 to operate wireless communication device 900 as described herein.

The session status logic of wireless communication device 900 may comprise an aggregation of software modules such as the following. Communication module 982 may drive communication interfaces 910 to send and receive communication status data. Display module 986 may render session icons for delivery to display 930 and handle user interactions. Session status module 984 may send and receive communication data through communication interfaces 910. Session status module 984 may also remember the most recently received communication status data for each communication contact known to wireless communication device 900. Implementations of the session status logic of wireless communication device 900 have flexibility as to how many software modules are present and how responsibilities are distributed amongst the modules.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device that maintains a communication contact, the method comprising:
   the wireless communication device receiving media session quality data for the communication contact;
   the wireless communication device receiving a request for a media session with the communication contact;
   in response to receiving the request, the wireless communication device identifying estimated media session quality with the communication contact based on the media session quality data for the communication contact;

the wireless communication device displaying a session activation icon for the media session request that visually indicates the estimated media session quality for the media session with the communication contact; and the wireless communication device receiving a user selection of the session activation icon and responsively establishing the media session with the communication contact.

2. The method of claim 1 wherein receiving the request for the media session with the communication contact comprises receiving the request from a user of the wireless communication device.

3. The method of claim 1 wherein receiving the request for the media session with the communication contact comprises receiving the request from the communication contact.

4. The method of claim 1 wherein displaying the session activation icon for the media session request that visually indicates the estimated media session quality comprises displaying the session activation icon with an icon color that indicates the estimated media session quality.

5. The method of claim 1 wherein displaying the session activation icon for the media session request that visually indicates the estimated media session quality comprises displaying the session activation icon with a red icon color that indicates a low estimated media session quality.

6. The method of claim 1 wherein displaying the session activation icon for the media session request that visually indicates the estimated media session quality comprises displaying the session activation icon with a yellow icon color that indicates a moderate estimated media session quality.

7. The method of claim 1 wherein displaying the session activation icon for the media session request that visually indicates the estimated media session quality comprises displaying the session activation icon with a green icon color that indicates a high estimated media session quality.

8. The method of claim 1 wherein displaying the session activation icon for the media session request that visually indicates the estimated media session quality comprises displaying the session activation icon with an icon fill-level that indicates the estimated media session quality.

9. The method of claim 1 wherein displaying the session activation icon for the media session request that visually indicates the estimated media session quality comprises displaying the session activation icon with an icon size that indicates the estimated media session quality.

10. The method of claim 1 wherein the media session comprises a voice call or a video call.

11. A wireless communication device that maintains a communication contact comprising:

a wireless communication interface configured to receive media session quality data for a communication contact;

a processing system configured to receive a request for a media session with the communication contact and in response the request, identify estimated media session quality with the communication contact based on the media session quality data for the communication contact;

a user interface configured to display a session activation icon for the media session request that visually indicates the estimated media session quality for the media session with the communication contact;

the user interface configured to receive a user selection of the session activation icon;

the processing system configured to establish the media session with the communication contact over the wireless communication interface responsive to the user selection of the session activation icon; and the wireless communication interface configured to exchange media data for the media session with the communication contact.

12. The wireless communication device of claim 11 wherein the user interface is configured to receive the request for the media session with the communication contact from a user of the wireless communication device.

13. The wireless communication device of claim 11 wherein the wireless communication interface is configured to receive the request for the media session with the communication contact from a communication network.

14. The wireless communication device of claim 11 wherein the user interface is configured to display the session activation icon with an icon color that indicates the estimated media session quality.

15. The wireless communication device of claim 11 wherein the user interface is configured to display the session activation icon with a red icon color that indicates a low estimated media session quality.

16. The wireless communication device of claim 11 wherein the user interface is configured to display the session activation icon with a yellow icon color that indicates a moderate estimated media session quality.

17. The wireless communication device of claim 11 wherein the user interface is configured to display the session activation icon with a green icon color that indicates a high estimated media session quality.

18. The wireless communication device of claim 11 wherein the user interface is configured to display the session activation icon with an icon fill-level that indicates the estimated media session quality.

19. The wireless communication device of claim 11 wherein the user interface is configured to display the session activation icon with an icon size that indicates the estimated media session quality.

20. The wireless communication device of claim 11 wherein the media session comprises a voice call or a video call.

* * * * *